(12) United States Patent
Cline

(10) Patent No.: US 9,889,952 B2
(45) Date of Patent: Feb. 13, 2018

(54) EXPANDABLE SPACECRAFT LAYER

(71) Applicant: Bigelow Aerospace LLC, Las Vegas, NV (US)

(72) Inventor: Frederic R. Cline, Las Vegas, NV (US)

(73) Assignee: Bigelow Aerospace LLC, North Las Vegas, NV (US)

( * ) Notice: Subject to any disclaimer, the term of this patent is extended or adjusted under 35 U.S.C. 154(b) by 493 days.

(21) Appl. No.: 14/545,284

(22) Filed: Apr. 16, 2015

(65) Prior Publication Data
US 2016/0304221 A1    Oct. 20, 2016

(51) Int. Cl.
| | | |
|---|---|---|
| *B64G 1/56* | (2006.01) | |
| *B64G 1/58* | (2006.01) | |
| *B64G 1/10* | (2006.01) | |
| *B64G 1/22* | (2006.01) | |

(52) U.S. Cl.
CPC .............. *B64G 1/56* (2013.01); *B64G 1/10* (2013.01); *B64G 1/222* (2013.01); *B64G 1/58* (2013.01); *B64G 2001/224* (2013.01)

(58) Field of Classification Search
CPC .... B64G 1/56; B64G 2001/224; B64G 1/222; B64G 1/58
See application file for complete search history.

(56) References Cited

U.S. PATENT DOCUMENTS

| | | | | |
|---|---|---|---|---|
| 4,666,107 A | * | 5/1987 | Berry ..................... | B64G 1/222 136/292 |
| 5,785,280 A | * | 7/1998 | Baghdasarian ........ | B64G 1/222 136/245 |
| 6,050,526 A | * | 4/2000 | Stribling, Jr. .......... | B64G 1/222 136/245 |
| 6,647,855 B1 | * | 11/2003 | Christiansen ............ | B64G 1/56 89/36.01 |
| 7,401,752 B2 | * | 7/2008 | Lundgren ................ | B64G 1/52 244/171.7 |
| 9,278,765 B2 | * | 3/2016 | Stokes .................. | B64G 1/1078 |
| 2003/0016186 A1 | * | 1/2003 | Watanabe .............. | B64G 1/222 343/912 |
| 2006/0090636 A1 | * | 5/2006 | Yang ........................ | B64G 1/56 89/36.11 |
| 2010/0166988 A1 | * | 7/2010 | Defoort ................... | B29C 65/14 428/34.1 |
| 2010/0187364 A1 | * | 7/2010 | Kutter .................. | B64G 1/1078 244/171.7 |
| 2012/0175467 A1 | * | 7/2012 | Dye ....................... | F16L 59/065 244/171.7 |
| 2013/0327894 A1 | * | 12/2013 | Bigelow .................. | B64G 1/56 244/159.4 |
| 2016/0200460 A1 | * | 7/2016 | Aston ..................... | B32B 37/16 244/171.7 |
| 2016/0207641 A1 | * | 7/2016 | Myers .................. | B64G 1/1078 |
| 2016/0297552 A1 | * | 10/2016 | Moser .................... | B64G 1/222 |

\* cited by examiner

*Primary Examiner* — Christopher P Ellis
(74) *Attorney, Agent, or Firm* — Gibbs & White P.C.; Franklin B. Gibbs

(57) ABSTRACT

A core element for use with an inflatable or expandable spacecraft is claimed. The core element has a plurality of panels connected by hinges so that the core element can be packed into a smaller volume for loading into a launch vehicle. Upon deployment in space, the core element can be unpacked and can enclose a larger volume than that in the packed state. Multiple core elements can be used to cover a spacecraft to a desired degree.

11 Claims, 7 Drawing Sheets

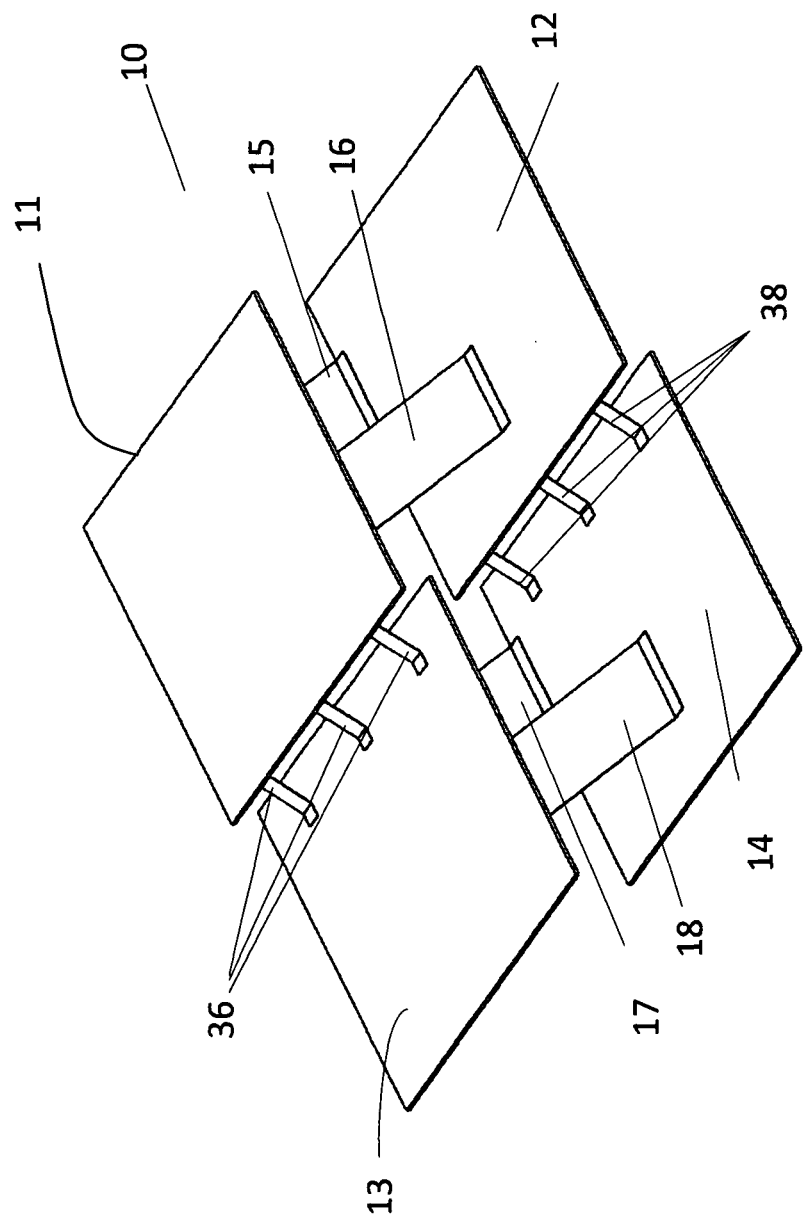

EXPANDABLE SPACECRAFT LAYER

FIELD OF THE INVENTION

This invention generally relates to covers for expandable and inflatable space structures.

BACKGROUND OF THE INVENTION

Spacecraft and space structures often require various layers of material to cover their outer surfaces. These layers serve a variety of purposes including, but not limited to, protecting the spacecraft from micrometeoroids and providing a protective thermal surface for the spacecraft. Typically, these layers consist of a single layer or blanket of material. However, multiple layered surfaces are not uncommon.

In the case of inflatable or expandable space structures, the presence and use of these materials pose several challenges. In inflatable or expandable space structures, the material must go from an un-inflated or unexpanded state, adapt to the changing size or shape of the structure, and arrive at the fully inflated or expanded state. One challenge in this process is the efficient packing of these layers while minimizing risk of damage to the material.

Typically, the material is folded over itself repeatedly until it sits bunched around the core structure. Outer spacecraft materials are relatively thick and, when folded, create excess bulk due to their bend radius. This excess bulk can affect mission success if the spacecraft can no longer fit in its launch vehicle. It also diminishes one of the important competitive advantage of inflatable and expandable space structures—namely, low launch volume requirements. In addition, by trying to tightly pack these thick folds, one may also subject the material to potential damage. This damage may hamper mission success by lowering the ability of the materials to perform their function (such as abrasion to thermal protection layers).

What is needed is a way of folding and packing the material that could be applied to a variety of shapes and sizes of spacecraft and space structures that allows the outer layer materials to be tightly packed while minimizing the materials' exposure to sharp bends and, therefore, damage.

SUMMARY OF THE INVENTION

An expandable spacecraft core element is disclosed and claimed. The core element can be combined with other core elements to cover a portion of the outer surface of spacecraft. In one embodiment, the core element has an upper panel having a bottom side, a first and second middle panels each having a top and bottom side, a lower panel having a top side, six hinges with each hinge having opposing ends.

Two of the hinges are attached to the bottom of the upper panel at one end of each hinge and to the top of the second middle panel on the other end of the hinges. The location of the attachments of the hinges allow the upper panel to substantially cover the second middle panel when the core element is packed and to partially cover the second middle panel when the core element is unpacked.

A third hinge is attached to the bottom of the upper panel at one end and the other end of the hinge is attached to the top of the first middle panel. The location of the attachments of the third hinge allows the upper panel to partially cover the first middle panel when the core element is packed and when the core element is unpacked, the upper panel covers less of the second middle panel than in the packed state.

A fourth and fifth hinge is attached to the bottom of the first middle panel at one end of each hinge and to the top of the lower panel at the other ends. The location of the attachments of the fourth and fifth hinges allows the first middle panel to substantially cover the lower panel when the core element is packed and the first middle panel covers the lower panel partially when unpacked.

The sixth hinge is attached to the bottom of the second middle panel on one end of the hinge and to the top of the lower panel on the other end of the hinge. The location of the attachments of the sixth hinge allows the second middle panel to partially the lower panel when the core element is packed and when the core element is unpacked, the second middle panel covers less of the lower panel than in the packed state.

In this embodiment, the location of the hinges allows the panels to move in two generally perpendicular directions in transitioning between the packed and unpacked states.

BRIEF DESCRIPTION OF THE DRAWINGS

Several aspects of the invention are generally shown by way of reference to the accompanying drawings in which:

FIG. 7 is an upper perspective view of another embodiment of a generalized core element with more hinges.

DETAILED DESCRIPTION OF THE INVENTION

Figure 1:
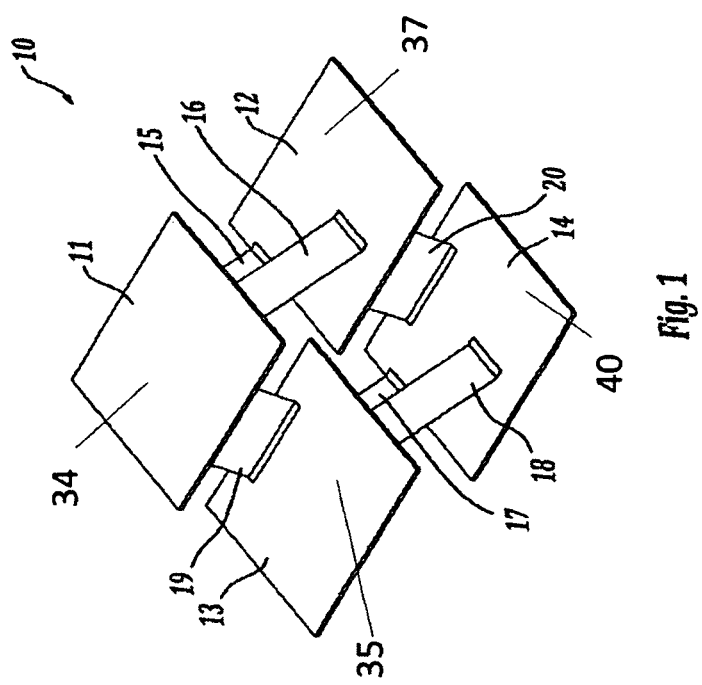
FIG. 1 is an upper perspective view of a generalized core element of one embodiment of the present invention.

FIG. 1 illustrates the core element 10 of one embodiment of the present invention. This core element 10 can be patterned and its subcomponents' shape altered such that it can create a layer of material over any inflatable or expandable spacecraft or space structure; a layer which can be efficiently packed and expand as the spacecraft or structure expands.

The core element 10 functions by separating the primary layer material from the elements necessary for folding. In the present embodiment, the core element has panels 11, 12, 13, 14, which are joined together by hinges 15, 16, 17, 18, 19, and 20. Each hinge has opposing ends.

The panels can be made of materials to support a particular mission. For example, the panels can be constructed of materials that would provide heat shielding to a spacecraft. Another example would be panels made of materials that would protect the spacecraft from space debris such as micrometeoroids.

The panels in the present embodiment are roughly square in shape, but other shapes can be used in other embodiments. Panel 11 has a top side 34 and an opposing bottom side that is not visible in the figure. Panel 13 is a first middle panel that has a top side 35 and an opposing bottom side. Panel 12 is a second middle panel that has a top side 37 and opposing bottom side. Panel 14 is a lower panel that has a top side 40.

Hinges 15, 16, 17, 18, 19, and 20 are made of a material with a low bend radius, perform the folds necessary for packing and thus eliminate folds in the panels 11, 12, 13, and 14 or primary layer material. The low bend radius characteristic of the hinges 15, 16, 17, 18, 19, and 20 minimizes any excess bulk due to folding and, as the hinges 15, 16, 17, 18, 19, and 20 fold, minimal to no damage occurs to the primary layer. In the present embodiment, the hinges are approximately rectangular in shape and each hinge has opposing ends. However, other embodiments can incorporate different geometries of hinges. The hinges may also incorporate characteristics to support a desired mission profile. For example, the hinges may be made from materials that experience minimal degradation from exposure to extreme changes in temperature.

In one embodiment, the hinges are sewn to the panels. In this embodiment, the side of the panel that is sewn to the hinge is adapted to receive the stitching. This point of contact may be a different material from the rest of the panel to allow for stitching to the hinge. In turn, the hinge may have an edge that is specially chosen to allow for stitching. In another embodiment mechanical fasteners may be used to attach the hinges to the panels.

In yet another embodiment, grommets can be used along with ropes or cords to attach the hinge to the panel. In this embodiment, the hinges and panel sides can be materials that would retain the grommets. The cords or ropes would be chosen from materials that could withstand the stresses and environment of space. Furthermore, in other embodiment the ropes could be used as a hinge.

In yet another embodiment, rivets could be used to secure the hinges to the panels. In this embodiment, the attachment sides of the panels that contact to the hinges would be comprised of materials that could retain rivets as would the materials at the connection points of the hinges.

The panel materials are chosen depending upon the need of the mission. In one embodiment the materials could be suited to protect the spacecraft from space debris such as micrometeoroids. This can include a multilayered soft micrometeroid shielding that can, itself, be packed. In another embodiment the material could be used to provide heat shielding. Again, the sides that would contact the hinges would be materials that would be appropriate for securing the panel to the hinge.

In another embodiment several layers of core elements could be utilized. For example, one layer could be for thermal protection and another layer could be used for protection from orbital debris.

Figure 2:
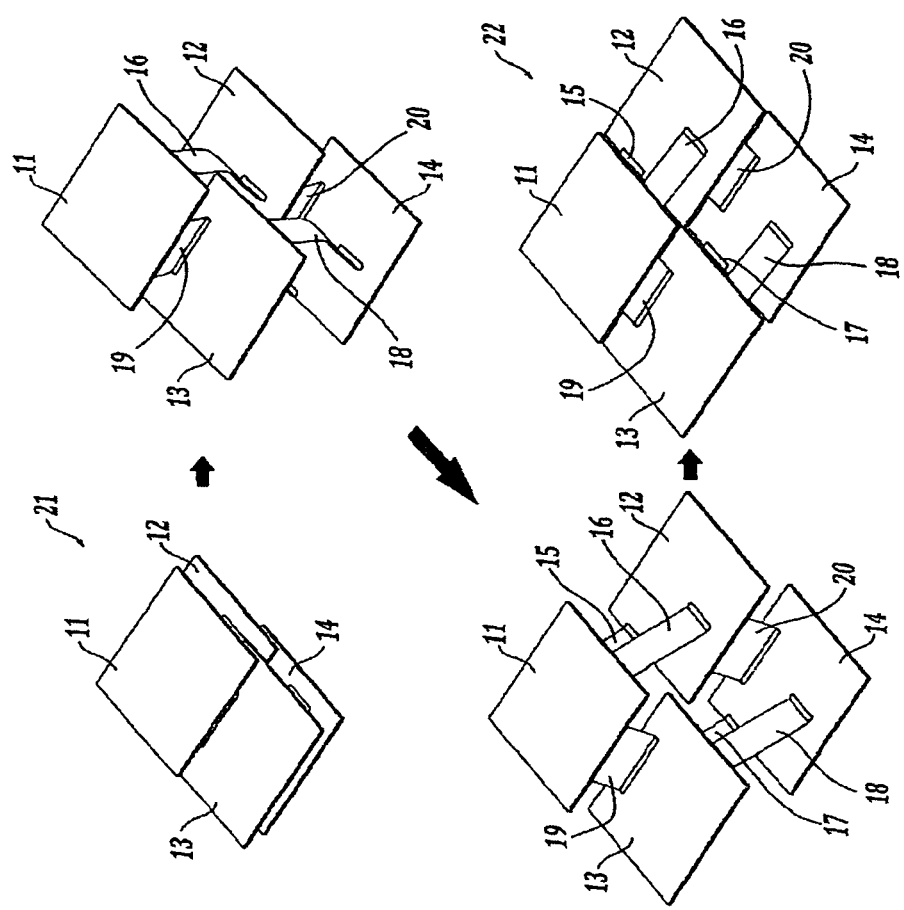
FIG. 2 consists of four upper perspective views that demonstrate the packing and unfolding of one embodiment of the present invention.

The movement of the panels 11, 12, 13, and 14 and hinges 15, 16, 17, 18, 19, and 20 can be seen in FIG. 2, which shows the packing of the panels. The panels 11, 12, 13, and 14 and hinges 15, 16, 17, 18, 19, and 20 are located in relation to one another to allow efficient packing and expansion. During packing and unpacking, the panels 11, 12, 13, and 14 move relative to one another in two primary directions. In the first direction, hinges 15, 16, 17, and 18 fold. In the second direction, the hinges 19 and 20 fold. The first direction hinges 15, 16, 17, and 18 are staggered; two hinges 16 and 18 attach near the center of panels 12 and 14 and near the edge of panels 11 and 13, while the two remaining first direction hinges 15 and 17 attach near the center of panels 11 and 13 and near the edge of panels 12 and 14. The staggering of the first direction hinges 15, 16, 17, and 18 allows for the second direction hinges 19 and 20 fold and for the panels 11, 12, 13, and 14 to nest relative to one another. In the present embodiment, the two directions are roughly perpendicular. The center, as identified in the figures, is not necessarily the center of a panel as measured from all edges. In the case of the present embodiment, the center is not necessarily the exact center of a square type panel. Rather, the center can be in the vicinity of the center of a panel or along a line that is approximately the center line in one direction. In other embodiments that incorporate different geometries of the panels, the location of the hinges can be chosen to allow for the packed and unpacked states while departing from the attachment locations of the hinges in the vicinity of the edge and center as identified in the present embodiment.

Figure 3:
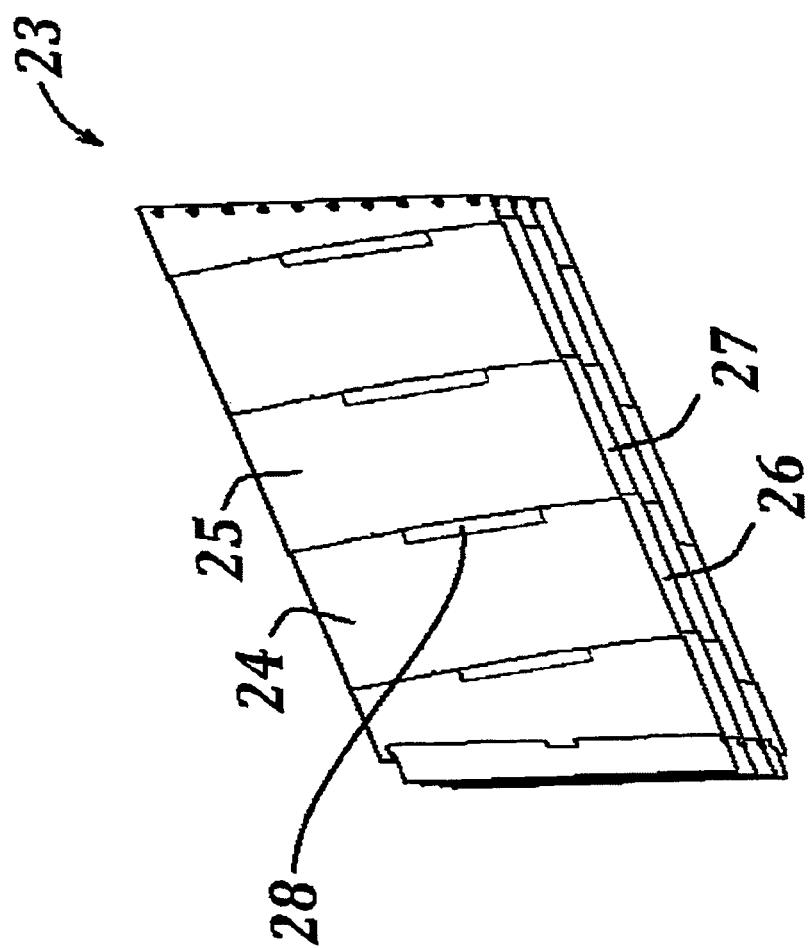
FIG. 3 is a perspective view of an application of one embodiment of the present invention where multiple core elements are connected in a packed state.
Figure 4:
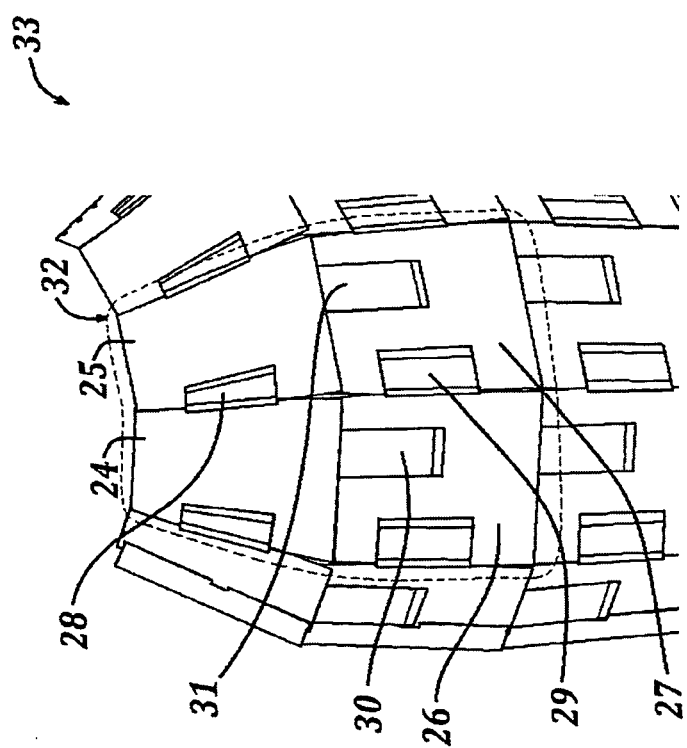
FIG. 4 is a perspective view of an application of one embodiment of the present invention used to cover a portion of an oblate spheroid. In this figure, the core elements are shown in an unpacked state.

FIG. 3 and FIG. 4 illustrate an application of using multiple connected core elements 10 to cover a portion of an oblate spheroid. The packed state 23 of FIG. 3 unpacks into the expanded state 33 of FIG. 4. The outlined area 32 is a direct application of the core element 10. Hinges 28, 29, 30, and 31 are analogous to hinges 20, 19, 16, and 18, respectively, of the core element 10. Hinges analogous to 15 and 17 of the core element 10 are present, but not visible. Panels 24, 25, 26, and 27 are analogous to panels 11, 12, 13, and 14, respectively, of the core element 10. The shape of the panels 24, 25, 26, and 27 and hinges 28, 29, 30, and 31 drive the final unpacked shape.

Figure 5:
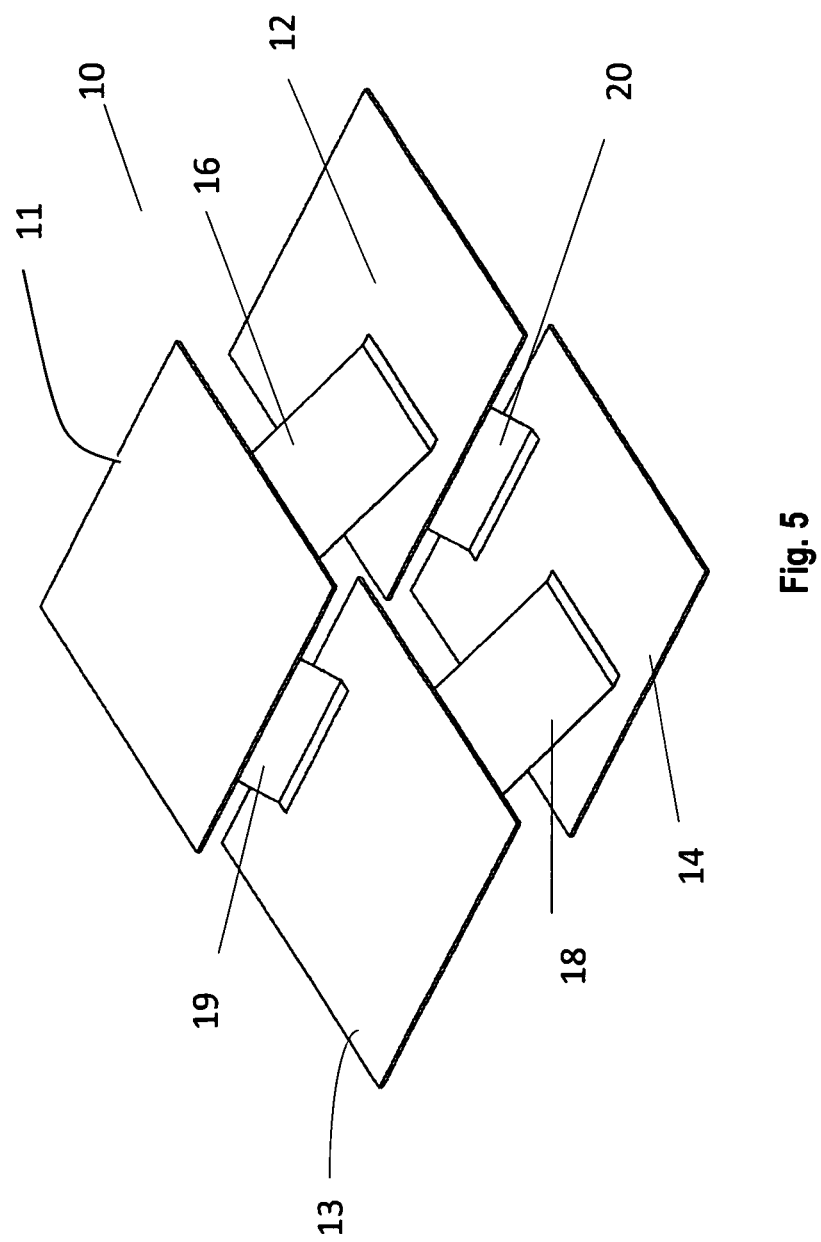
FIG. 5 is an upper perspective view of another embodiment of a generalized core element.
Figure 6:
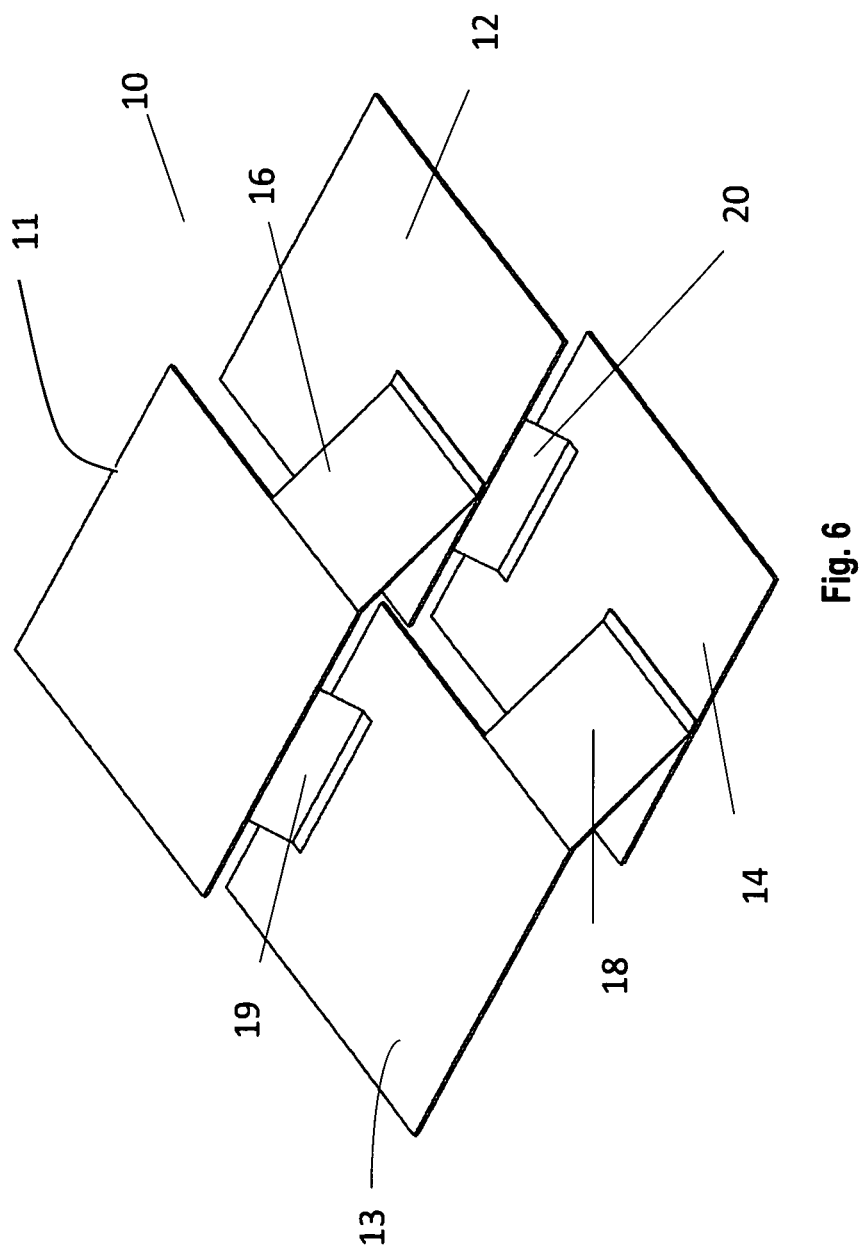
FIG. 6 is an upper perspective view of yet another embodiment of a generalized core element with the hinges in different locations.

Turning to FIG. 5, this embodiment of the core element 10 has four hinges 16, 18, 19, and 20. FIG. 6, identifies four hinges 16, 18, 19 and 20 at different locations of attachments than those for FIG. 5.

In yet another embodiment, FIG. 7 discloses multiple hinges 36 and 38, which are narrower than the hinges identified in FIGS. 1, 5, and 6. The core element 10 can be comprised of a number of hinges to accommodate a particular mission requirement.

In one embodiment, the hinges can be made from flexible materials that would incorporate finely woven carbon fabrics. In other embodiments, the hinges could be made primarily from Kevlar® or carbon fiber. In yet other embodiments the hinges may be made of primarily finely woven carbon fabrics. In other embodiments, materials like Kevlar® could be coated or impregnated with materials that would be useful, for example, in heat shielding or impact protection from space debris such as micrometeoroids.

While embodiments have been described in detail, it should be appreciated that various modifications and/or variations may be made without departing from the scope or spirit of the invention. In this regard it is important to note that practicing the invention is not limited to the applications described herein. Many other applications and/or alterations may be utilized provided that such other applications and/or alterations do not depart from the intended purpose of the invention. Also, features illustrated or described as part of one embodiment may be used in another embodiment to provide yet another embodiment such that the features are not limited to the embodiments described herein. Thus, it is intended that the invention cover all such embodiments and variations. Nothing in this disclosure is intended to limit the scope of the invention in any way.

What is claimed is:

1. An expandable spacecraft core element comprising:
an upper panel;
a lower panel;
a first middle panel;
a second middle panel;
a plurality of hinges;

the upper panel connected to the first middle panel by at least one hinge;
the upper panel connected to the second middle panel by at least two hinges;
the first middle panel connected to the lower panel by at least two hinges;
the second middle panel connected to the lower panel by at least one hinge;
In a packed state the upper panel partially covers first middle panel and substantially covers the second middle panel, the first middle panel substantially covers the lower panel, and the second middle panel partially covers the lower panel; and
In an unpacked state, the upper panel partially covers first and second middle panels, and the first and second middle panels partially covers the lower panel.

2. An expandable spacecraft core element comprising:
an upper panel and having a bottom side;
a first and second middle panels each having a top and bottom side;
a lower panel having a top side;
two hinges, each hinge having opposing ends and each hinge attached to the bottom of the upper panel at one end of the hinges and to the top of the second middle panel on the other end of the hinges;
a hinge, having opposing ends and attached to the bottom of the upper panel at one end of the hinge and to the top of the first middle panel at the other end of the hinge;
two hinges, each hinge having opposing ends, each hinge attached to the bottom of the first middle panel at one end and to the top of the lower panel at the other end; and
a hinge, having opposing ends, attached to the bottom of the second middle panel at one end of the hinge, and to the top of the lower panel the other end of the hinge;
wherein, in a packed state the upper panel partially covers the first panel and substantially covers the second middle panel, the first middle panel substantially covers the lower panel, and the second middle panel partially covers the lower panel;
wherein, in an unpacked state, the upper panel partially covers the first middle panel and the second middle panel, the first middle panel partially covers the lower panel, and the second middle panel partially covers the lower panel.

3. An expandable spacecraft core element comprising:
an upper panel having a bottom side;
a first and second middle panels and each having a top and bottom side;
a lower panel having a top side;
two hinges, each hinge having opposing ends and each hinge attached to the bottom of the upper panel at one end of the hinge and to the top of the second middle panel on the other end of the hinge;
a hinge, having opposing ends and attached to the bottom of the upper panel at one end of the hinge and to the top of the first middle panel at the other end of the hinge;
two hinges, each hinge having opposing ends, each hinge attached to the bottom of the first middle panel at one end and to the top of the lower panel at the other end;
a hinge, having opposing ends, attached to the bottom of the second middle panel at one end of the hinge, and to the top of the lower panel the other end of the hinge;
wherein, in a packed state the upper panel partially covers the first panel and substantially covers the second middle panel, the first middle panel substantially covers the lower panel, and the second middle panel partially covers the lower panel;
wherein, in an unpacked state, the upper panel partially covers the first middle panel and the second middle panel, the first middle panel partially covers the lower panel, and the second middle panel partially covers the lower panel.

4. The expandable spacecraft core element of claim 3 wherein the upper panel is square.

5. The expandable spacecraft core element of claim 3 wherein the first and second middle panels are square.

6. The expandable spacecraft core element of claim 3 wherein the lower panel is square.

7. An expandable spacecraft core element comprising:
an upper panel having a bottom side;
a first and second middle panels each having a top and bottom side;
a lower panel having a top side;
a hinge attached to the bottom of the upper panel at one end at approximately the vicinity of the center of the upper panel and the opposite end of the hinge attached to the top of the first middle panel at approximately the vicinity of an edge of the first middle panel;
a hinge attached to the bottom of the upper panel at one end at approximately the edge of the upper panel and the opposite end of the hinge attached to the top of the second middle panel at the other end at approximately the vicinity of an edge of the second middle panel;
a hinge attached to the bottom of the upper panel at approximately the edge of the upper panel at one end and the opposite end attached to the top of the second middle panel at approximately the vicinity of the edge of the first middle panel;
a hinge attached to the bottom of the first middle panel at approximately the edge of the first middle panel at one end and attached approximately in the vicinity of the center of the top of the lower panel at the other end;
a hinge attached to the bottom of the first middle panel in the vicinity of the center of the first middle panel at one end and attached in approximately the vicinity of edge of the lower panel at the other end; and
a hinge attached to the bottom of the second middle panel at approximately the vicinity of the edge of the second middle panel at one end and attached approximately in the vicinity of the edge of the lower panel at the other end;
wherein, in a packed state the upper panel partially covers the first middle panel and substantially covers the second middle panel, the first middle panel substantially covers the lower panel, and the second middle panel partially covers the lower panel, and the core element approximates the shape of a rectangle;
wherein, in an unpacked state, the upper panel partially covers the first middle panel and the second middle panel, the first middle panel partially covers the lower panel, and the second middle panel partially covers the lower panel, and the core element approximates the shape of a square.

8. The expandable spacecraft core element of claim 7 wherein the upper panel is substantially square.

9. The expandable spacecraft core element of claim 7 wherein the first and second middle panels are substantially square.

10. The expandable spacecraft core element of claim 7 wherein the lower panel is substantially square.

11. An expandable spacecraft core element comprising:
an upper panel having a bottom side;
a first and second middle panels each having a top and bottom side;

a lower panel having a top side;

six hinges with each hinge having opposing ends two hinges attached to the bottom of the upper panel at one end of each hinge and to the top of the second middle panel on the other end of the hinges and the location of the attachments of the hinges allow the upper panel to substantially cover the second middle panel when the core element is packed and to partially cover the second middle panel when the core element is unpacked;

a third hinge attached to the bottom of the upper panel at one end and the other end of the hinge is attached to the top of the first middle panel and the location of the attachments of the third hinge allows the upper panel to partially cover the first middle panel when the core element is packed and when the core element is unpacked, the upper panel covers less of the second middle panel than in the packed state;

a fourth and fifth hinge attached to the bottom of the first middle panel at one end of each hinge and to the top of the lower panel at the other ends and the location of the attachments of the fourth and fifth hinges allows the first middle panel to substantially cover the lower panel when the core element is packed and the first middle panel covers the lower panel partially when unpacked; and a sixth hinge attached to the bottom of the second middle panel on one end of the hinge and to the top of the lower panel on the other end of the hinge and the location of the attachments of the sixth hinge allows the second middle panel to partially cover the lower panel when the core element is packed and when the core element is unpacked, the second middle panel covers less of the lower panel than in the packed state.

\* \* \* \* \*